US010710432B2

(12) United States Patent
Ichishi et al.

(10) Patent No.: US 10,710,432 B2
(45) Date of Patent: Jul. 14, 2020

(54) VEHICLE AIR CONDITIONER

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yoshinori Ichishi, Kariya (JP); Takeshi Wakisaka, Kariya (JP); Masahiko Morikawa, Kariya (JP); Takahiro Araki, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/575,053

(22) PCT Filed: Jun. 9, 2016

(86) PCT No.: PCT/JP2016/002790
§ 371 (c)(1),
(2) Date: Nov. 17, 2017

(87) PCT Pub. No.: WO2016/199421
PCT Pub. Date: Dec. 15, 2016

(65) Prior Publication Data
US 2018/0134122 A1    May 17, 2018

(30) Foreign Application Priority Data

Jun. 12, 2015  (JP) ................................. 2015-119092

(51) Int. Cl.
*B60H 1/32*  (2006.01)
*F02D 29/02*  (2006.01)

(52) U.S. Cl.
CPC ............. *B60H 1/322* (2013.01); *F02D 29/02* (2013.01); *B60H 2001/3261* (2013.01); *B60H 2001/3273* (2013.01)

(58) Field of Classification Search
CPC ..... B60H 1/322; B60H 1/3261; B60H 1/3273
See application file for complete search history.

(56) References Cited

U.S. PATENT DOCUMENTS 6,330,909 B1     12/2001  Takahashi et al.
2007/0265762 A1* 11/2007  Suzuki ................... B60H 1/004
                                              701/102

(Continued)

FOREIGN PATENT DOCUMENTS

CN    102596604 A    7/2012
EP      2169212 A2   3/2010

(Continued)

*Primary Examiner* — Marc E Norman
(74) *Attorney, Agent, or Firm* — Harness, Dickey & Pierce, P.L.C.

(57) ABSTRACT

A vehicle air conditioner has a compressor, a radiator, a pressure reducer, a cooling heat exchanger, a temperature detector, and a prohibition request output part. The compressor draws and discharges a refrigerant. The radiator dissipates heat of the refrigerant. The pressure reducer decompresses and expands the refrigerant. The cooling heat exchanger cools an air blown into a vehicle compartment. The temperature detector detects a temperature of the cooling heat exchanger. The prohibition request output part outputs a request, which prohibits the idle stop control, to an idle stop controller when the engine is operated. The request prohibits the idle stop control until the temperature of the cooling heat exchanger falls to a temperature being enough cool to cool the air and a required cooling time elapses. The required cooling time is estimated to be required to make a passenger feel cool by the air.

4 Claims, 8 Drawing Sheets

(56) References Cited

U.S. PATENT DOCUMENTS

2010/0095689 A1* 4/2010 Shiroyama ......... B60H 1/00778
  62/115
2012/0215430 A1 8/2012 Watanabe et al.
2014/0041828 A1* 2/2014 Yoshida ............. B60H 1/00642
  165/41

FOREIGN PATENT DOCUMENTS

| JP | S60030333 U | 3/1985 |
| JP | H05147424 A | 6/1993 |
| JP | 2002047964 A | 2/2002 |
| JP | 2010101250 A | 5/2010 |

* cited by examiner

VEHICLE AIR CONDITIONER

CROSS REFERENCE TO RELATED APPLICATIONS

This application is a U.S. National Phase Application under 35 U.S.C. 371 of International Application No. PCT/JP2016/002790 filed on Jun. 9, 2016 and published in Japanese as WO 2016/199421 A1 on Dec. 15, 2016. This application is based on and claims the benefit of priority from Japanese Patent Application No. 2015-119092 filed on Jun. 12, 2015. The entire disclosures of all of the applications are incorporated herein by reference.

TECHNICAL FIELD

The present disclosure relates to a vehicle air conditioner for a vehicle in which an idle stop control is performed.

BACKGROUND ART

Patent Literature 1 discloses an engine automatic stop control that performs an idle stop control while securing a required air conditioning performance. The idle stop control stops an engine when the engine comes into an idle state.

Patent Literature 1 teaches that a temperature shift of an engine cooling water over time after the engine is stopped is estimated, and then a stop condition to stop the engine is set based on the estimated temperature shift. The engine is started automatically based on an air outlet temperature when the engine is stopped and an air conditioner is operated. The air outlet temperature is a temperature of air flowing out of the air conditioner.

Thus, a heating operation can be performed using heat, which is generated in the engine, by starting the engine before a passenger feels cold.

PRIOR ART LITERATURES

Patent Literature

Patent Literature 1: JP 2010-101250 A

SUMMARY OF INVENTION

However, according to studies by the inventors of the present disclosure, the engine automatic stop control of Patent Literature 1 may cause an abnormality in some cases. In other words, since the engine is stopped based on the temperature shift of the engine cooling water, the engine may be stopped before the passenger feels comfortable, e.g., in a case that an air conditioning is just started operating or that the idle stop is performed repeatedly. As a result, the air conditioning may not be able to make the passenger feel comfortable sufficiently.

Accordingly, the passenger could not feel comfortable sufficiently when a duration, while the air conditioner supplies air, is too short even in a case that a temperature of the air flowing out of the air conditioner is appropriate.

The present disclosure addresses the above issues, and it is an objective of the present disclosure to provide a vehicle air conditioner that is used in a vehicle, which performs an idle stop control, and improves a comfort air conditioning.

A vehicle air conditioner of the present disclosure is mounted to a vehicle having an idle stop controller. The idle stop controller performs an idle stop control that stops an engine when the engine comes into an idle state.

The vehicle air conditioner has a compressor, a radiator, a pressure reducer, a cooling heat exchanger, a temperature detector, and a prohibition request output part. The compressor is operated by the engine, draws a refrigerant, and discharges the refrigerant. The radiator dissipates heat of the refrigerant discharged from the compressor. The pressure reducer decompresses and expands the refrigerant, which flows to the pressure reducer after dissipating the heat in the radiator. The cooling heat exchanger cools an air, which is blown into a vehicle compartment, by using the refrigerant, which flows to the cooling heat exchanger after being decompressed and expanded in the pressure reducer. The temperature detector detects a temperature of the cooling heat exchanger. The prohibition request output part outputs a request, which prohibits the idle stop control, to the idle stop controller when the engine is operated. The request prohibits the idle stop control until the temperature of the cooling heat exchanger falls to a temperature being enough cool to cool the air and a required cooling time elapses. The required cooling time is estimated to be required to make a passenger feel cool by the air that is cooled in the cooling heat exchanger.

According to the above-described configuration, it can be suppressed that the engine is operated briefly and then stopped before the passenger feels cool. In other words, it can be suppressed that the compressor is stopped and therefore the cooling heat exchanger comes into a state of not being capable of cooling the air before the passenger feels cool. As a result, the comfort air conditioning can be improved.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
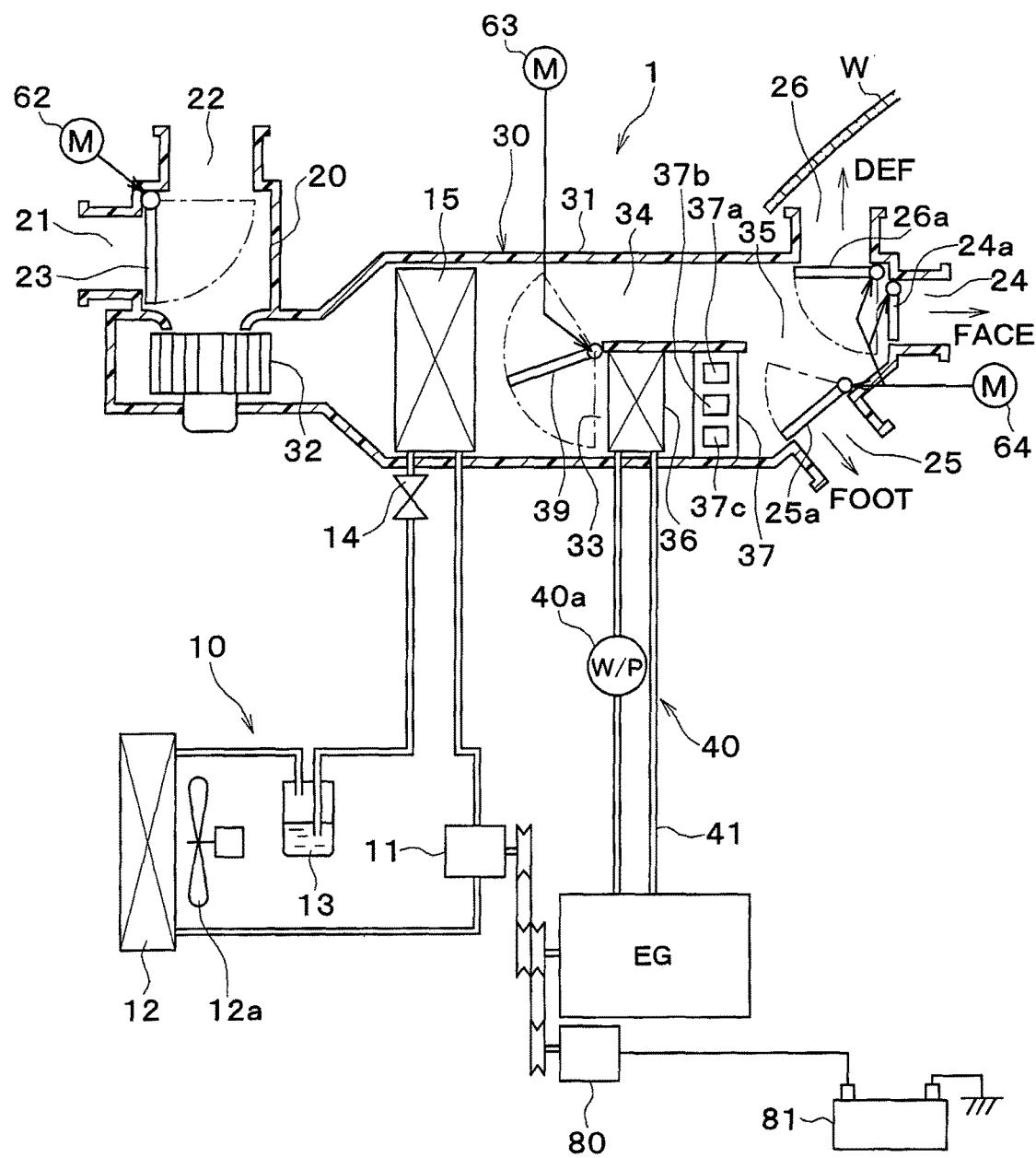
FIG. 1 is a schematic diagram illustrating a whole of a vehicle air conditioner according to a first embodiment.
Figure 2:
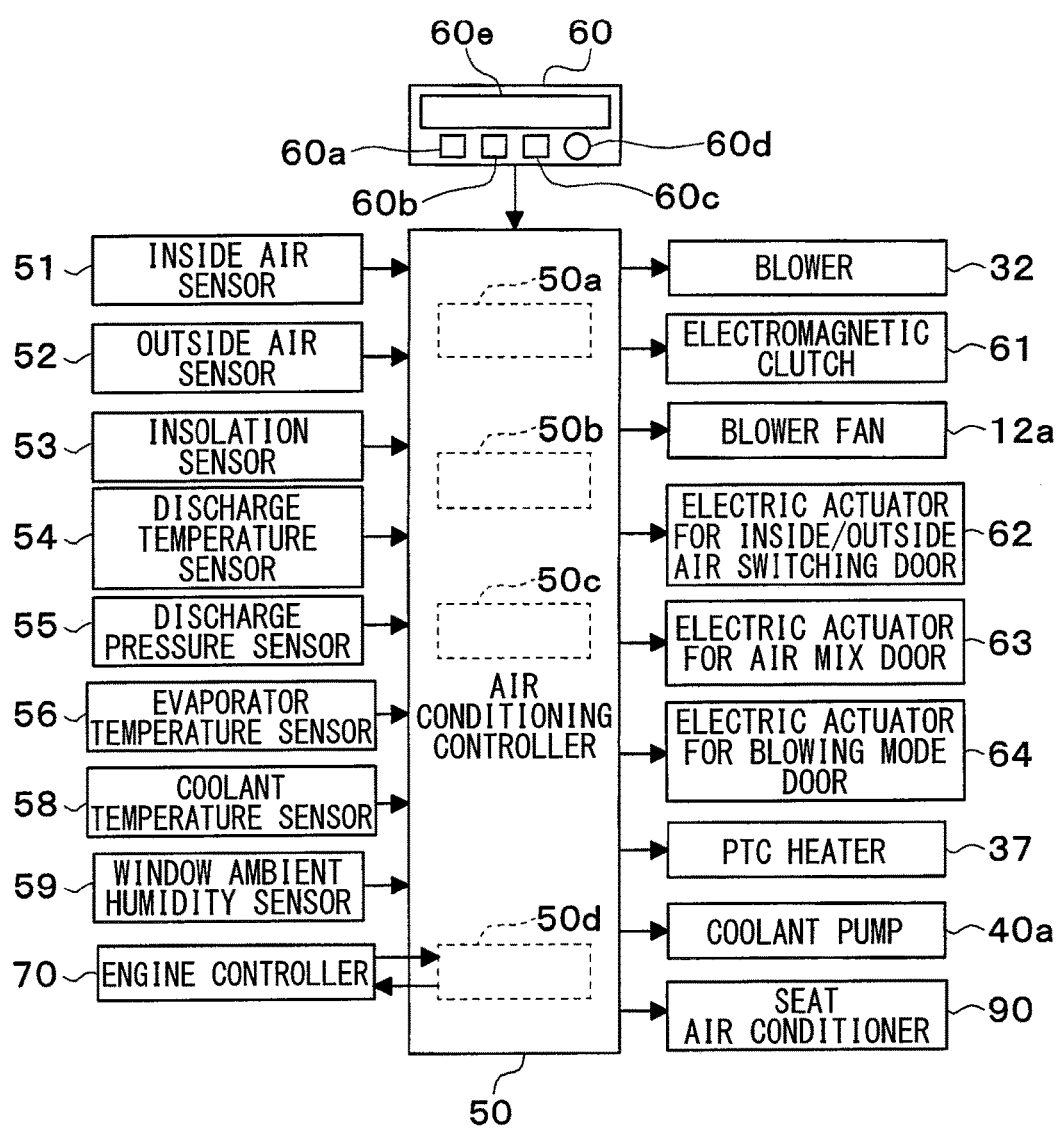
FIG. 2 is a block diagram illustrating an electronic control unit of the vehicle air conditioner according to the first embodiment.

A first embodiment will be described hereinafter referring to drawings. FIG. 1 is a diagram illustrating a whole of a vehicle air conditioner 1 of the present embodiment. FIG. 2 is a block diagram illustrating a configuration of an electronic control unit of the vehicle air conditioner. The vehicle air conditioner 1 is mounted to a vehicle in which an engine EG generates power to move the vehicle.

The power generated by the engine EG is used to operate a power generator 80 in addition to move the vehicle. The power generator 80 generates electric power, and the electric power is stored in a battery 81. The electric power stored in the battery 81 is supplied to various devices mounted to the vehicle. The various devices include electric components configuring the vehicle air conditioner 1.

The vehicle air conditioner 1 performs an air conditioning for a vehicle compartment by using the power supplied from the engine EG and the electric power supplied from the battery 81. The vehicle air conditioner 1 has a refrigeration cycle 10, an interior air conditioning unit 30 shown in FIG. 1, and an air conditioning controller 50 shown in FIG. 2.

The interior air conditioning unit 30 is located inside an instrument panel that is positioned in a foremost area in the vehicle compartment. The interior air conditioning unit 30 has a case 31 that provides an exterior surface of the interior air conditioning unit 30. The case 31 houses a blower 32, an evaporator 15, a heater core 36, and a PTC heater 37.

The case 31 defines an air passage in which air (i.e., supplied air) to be supplied into the vehicle compartment flows. The case 31 is made of resin (e.g., polypropylene) having a certain elasticity and a great intensity.

An inside/outside air switching case 20 is located at a most-upstream end of the case 31 in a flow direction of the air. The inside/outside air switching case 20 is an inside/outside air switching part that selectively introduces an air from an inside of the vehicle compartment and an air from an outside of the vehicle compartment. The air from the inside of the vehicle compartment and the air from the outside of the vehicle compartment will be hereinafter referred to as an inside air and an outside air respectively.

The inside/outside air switching case 20 has an inside air inlet 21 and an outside air inlet 22. The inside air inlet 21 is an inside air introducing portion that introduces the inside air into the case 31. The outside air inlet 22 is an outside air introducing portion that introduces the outside air into the case 31.

An inside/outside air switching door 23 is located inside the inside/outside air switching case 20. The inside/outside air switching door 23 continuously adjusts opening areas of the inside air inlet 21 and the outside air inlet 22. In other words, the inside/outside air switching door 23 is a volume ratio adjuster (i.e., a suction mode setting part) that changes a ratio between a volume of the inside air introduced into the case 31 and a volume of the outside air introduced into the case 31.

The inside/outside air switching door 23 is operated by an electric actuator 62. The electric actuator 62 for the inside/outside air switching door 23 is operated based on a control signal output from the air conditioning controller 50.

The inside/outside air switching door 23 is the suction mode setting part that sets various suction modes selectively. The suction modes include an inside air mode, an outside air mode, and an inside/outside mixed air mode.

In the inside air mode, the inside/outside air switching door 23 fully opens the inside air inlet 21 and fully closes the outside air inlet 22, whereby the inside air is introduced into the case 31. In the outside air mode, the inside/outside air switching door 23 fully closes the inside air inlet 21 and fully opens the outside air inlet 22, whereby the outside air is introduced into the case 31.

In the inside/outside mixed air mode, the inside/outside air switching door 23 continuously adjusts the opening area of the inside air inlet 21 and the outside air inlet 22, whereby the ratio between the volume of the inside air and the volume of the outside air flowing into the case 31 varies continuously. In other words, the ratio in the inside/outside mixed air mode varies in a range between the ratio in the inside air mode and the ratio in the outside air mode.

The blower 32 is located downstream of the inside/outside air switching case 20 in the flow direction of the air. The blower 32 is a blowing device that draws the air through the inside/outside air switching case 20 and blows the air toward the vehicle compartment. The blower is an electric blower that has a centrifugal multi-blades fan operated by an electric motor. A rotational speed of the electric motor for the blower 32 is controlled based on a control voltage output from the air conditioning controller 50. Thus, a blown volume of air blown by the blower 32 is controlled.

The evaporator 15 is located downstream of the blower 32 in the flow direction of the air. A refrigerant as a heat medium flows in the evaporator 15. The evaporator 15 is a heat exchanger that performs a heat exchange between the air blown from the blower 32 and the refrigerant. In other words, the evaporator 15 is a cooler that cools air using the refrigerant.

The evaporator 15 configures the refrigeration cycle 10. The refrigeration cycle 10 is an air temperature adjuster that adjusts a temperature of the air blown into the vehicle compartment by using the power generated by the engine EG.

The refrigeration cycle 10 has a compressor 11, a condenser 12, a gas-liquid separator 13, an expansion valve 14, and the evaporator 15.

The compressor 11 draws the refrigerant circulating in the refrigeration cycle 10, compresses the refrigerant, and then discharges the refrigerant. That is, the compressor 11 is a compression part. The compressor 11 is located in an engine room of the vehicle and rotary driven by the power generated by the engine EG and supplied to the compressor 11 through a pulley and a belt.

The compressor 11 is a variable capacity compressor or a fixed capacity compressor. The variable capacity compressor is a compressor of which refrigerant discharge performance is controlled by changing a discharge capacity. The fixed capacity compressor is a compressor of which refrigerant discharge performance is controlled in a manner that an operation rate is changed by operating an electromagnetic clutch intermittently.

The refrigerant discharged from the compressor 11 flows in the condenser 12. The condenser 12 is an exterior heat exchanger that condenses the refrigerant by performing a heat exchange between the outside air, which is blown from a blower fan 12*a* of an exterior blower, and the refrigerant. The condenser 12 is located in the engine room of the vehicle. The condenser 12 is a heat dissipator that dissipates heat of the refrigerant discharged from the compressor 11.

The blower fan 12*a* is an electric blower of which rotational speed is controlled based on a control voltage output from the air conditioning controller 50. By controlling the rotational speed of the blower fan 12*a*, a volume of the air (i.e., blown air volume) blown by the blower fan 12*a* is controlled.

The gas-liquid separator 13 separates the refrigerant, which flows to the gas-liquid separator 13 after being condensed in the condenser 12, into a gas-phase refrigerant and a liquid-phase refrigerant. The gas-liquid separator 13 stores an excess refrigerant, thereby serving as a receiver. Only the liquid-phase refrigerant flows out of the gas-liquid separator 13 and toward a downstream side of the gas-liquid separator 13. The expansion valve 14 is a pressure reducer that decompresses and expands the liquid-phase refrigerant flowing out of the gas-liquid separator 13. The evaporator 15 is an interior heat exchanger that evaporates the refrigerant, which flows to the evaporator 15 after being decompressed and expanded in the expansion valve 14, to cause the refrigerant to exert a heat absorption function. In other words, the evaporator 15 is a cooling heat exchanger that cools the air.

The case 31 of the interior air conditioning unit 30 defines a cool-air heating passage 33, a cool air bypass passage 34, and a mixing space 35 therein.

Each of the cool-air heating passage 33 and the cool air bypass passage 34 is an air passage in which the air after passing through the evaporator 15 flows. The cool-air heating passage 33 and the cool air bypass passage 34 are defined in parallel. The mixing space 35 is a space in which air, after passes through the cool-air heating passage 33, and air, after passing through the cool air bypass passage 34, are mixed with each other.

In the cool-air heating passage 33, the heater core 36 and the PTC heater 37 are arranged in this order in the flow direction of the air. The heater core 36 and the PTC heater 37 are air heaters that heat the air, which flows thereto after passing through the evaporator 15.

The heater core 36 is a heating heat exchanger that heats the air, which flows to the heater core 36 after passing through the evaporator 15, by using a coolant. The coolant is a heat medium circulating in a coolant circuit 40. The coolant circuit 40 has the heater core 36 and the engine EG being connected to each other by a coolant pipe. The engine EG is a coolant heater that heats the coolant circulating in the coolant circuit 40.

The coolant circuit 40 has a coolant pump 40*a*. The coolant pump 40*a* is a coolant circulator that circulates the coolant in the coolant circuit 40. The coolant pump 40*a* is an electric water pump of which rotational speed (i.e., a coolant circulation volume) is controlled based on a control voltage output from the air conditioning controller 50. By controlling the rotational speed of the coolant pump 40*a*, a volume of the coolant circulating in the coolant circuit 40 is controlled. The coolant pump 40*a* may be rotary driven by the power generated by the engine EG.

The heater core 36 and the coolant circuit 40 are an air temperature adjuster that adjusts a blowing air temperature by using heat generated in the engine EG. The blowing air temperature is a temperature of the air blown from the interior air conditioning unit 30 into the vehicle compartment.

The PTC heater 37 is an auxiliary heater that heats the air, which flows to the PTC heater 37 after passing through the heater core 36. The PTC heater 37 is an electric heater that has a PTC element (i.e., a positive characteristic thermistor). The PTC element generates heat when electric power is supplied to the PTC element. A power consumption required to operate the PTC heater 37 is less than a power consumption required to operate the compressor 11 of the refrigeration cycle 10.

The PTC heater 37 has two or more heaters. Each of the heaters has a positive end that is connected to the battery 81 and a negative end that is connected to a ground through a switching element. The switching element is an energization switching part that switches the PCT element of each heater between being energized and not being energized.

Operations of the switching elements are controlled independently based on control signals output from the air conditioning controller 50. That is, the switching elements are switched between being energized and not being energized independently, whereby a quantity of the heaters exerting a heating performance can be changed. As a result, a heating performance of the PTC heater 37 as a whole can be changed.

The cool air bypass passage 34 is an air passage that guides the air, which flows to the cool air bypass passage 34 after passing through the evaporator 15, to flow to the mixing space 35 without passing through the heater core 36 and the PTC heater 37. An air mix door 39 is located downstream of the evaporator 15. The air mix door 39 is arranged adjacent to an inlet of the cool-air heating passage 33 and an inlet of the cool air bypass passage 34.

The air mix door 39 is a volume ratio adjuster that continuously changes a ratio between a volume of the cool air flowing into the cool-air heating passage 33 and a volume of the cool air flowing into the cool air bypass passage 34. In other words, the air mix door 39 is a temperature adjuster that adjusts the temperature of the air blown into the vehicle compartment. That is, the air mix door 39 changes the ratio between the volume of the cool air flowing into the cool-air heating passage 33 and the volume of the cool air flowing into the cool air bypass passage 34, thereby changing a temperature of air (i.e., mixed air) mixed in the mixing space 35.

The air mix door 39 is a cantilever door that has a rotary shaft and a door body having a plate shape. The rotary shaft of the air mix door 39 is operated by an electric actuator 63 for the air mix door 39. The door body of the air mix door 39 has one side that is attached to the rotary shaft of the air mix door 39. An operation of the electric actuator 63 for the air mix door 39 is controlled based on a control signal output from the air conditioning controller 50.

The case 31 has a most-downstream portion in the flow direction of the air, and the most-downstream portion has air outlets 24, 25, 26. The air outlets 24, 25, 26 are blowing portions that blow air, which flows from the mixing space 35, into the vehicle compartment. In other words, the air outlets 24, 25, 26 are blowing portions that blows air, of which temperature is adjusted, into an air conditioning target space.

The air outlets 24, 25, 26 are a face air outlet 24, a foot air outlet 25, and a defroster air outlet 26. The face air outlet 24 blows conditioned air toward an upper body of the passenger in the vehicle compartment. The foot air outlet 25 blows the conditioned air toward foot of the passenger. The defroster air outlet 26 blows the conditioned air toward an inner surface of a windshield of the vehicle.

A face door 24a, a foot door 25a, and a defroster door 26a are located upstream of the face air outlet 24, the foot air outlet 25, and the defroster air outlet 26 in the flow direction of the air respectively.

The face door 24a adjusts an opening area of the face air outlet 24. The foot door 25a adjusts an opening area of the foot air outlet 25. The defroster door 26a adjusts an opening area of the defroster air outlet 26.

That is, the face door 24a, the foot door 25a, and the defroster door 26a are a blowing mode switching part that sets various blowing modes selectively. The face door 24a, the foot door 25a, and the defroster door 26a are operated to rotate by being connected to an electric actuator 64 for the blowing mode doors through a link mechanism (not shown). An operation of the electric actuator 64 for the blowing mode doors is controlled based on control signals output from the air conditioning controller.

The various blowing modes, which are set by the face door 24a, the foot door 25a, and the defroster door 26a selectively, includes a face mode, a bi-level mode, a foot mode, and a foot-defroster mode.

In the face mode, the face air outlet 24 is fully open, whereby the air is blown from the face air outlet 24 toward the upper body of the passenger. In the bi-level mode, the face air outlet 24 and the foot air outlet 25 are open, whereby the air is blown toward the upper body and the foot of the passenger.

In the foot mode, the foot air outlet 25 is fully open and the defroster air outlet 26 is slightly open, whereby the air is blown mainly from the foot air outlet 25. In the foot-defroster mode, the foot air outlet 25 and the defroster air outlet 26 are open with substantially the same degree, whereby the air is blown both from the foot air outlet 25 and the defroster air outlet 26.

The defroster mode may be set in a manner that the passenger manually operates a switch of an operation panel 60 shown in FIG. 2. In the defroster mode, the defroster air outlet 26 is fully open, whereby the air is blown from the defroster air outlet 26 toward the inner surface of the windshield of the vehicle.

The vehicle air conditioner 1 has an electric heating defogger (not shown). The electric heating defogger is a window heater that suppresses a defogging of the window or defogs the window. The electric heating defogger is an electric heating wire that is arranged inside the window or on a surface of the window. An operation of the electric heating defogger is controlled by a control signal output from the air conditioning controller 50.

The vehicle air conditioner 1 has a seat air conditioner 90 shown in FIG. 2. The seat air conditioner 90 is an auxiliary heater that increases a surface temperature of a seat for the passenger. The seat air conditioner 90 is a seat heater that heats the seat when electric power is supplied to the seat air conditioner 90. The seat air conditioner 90 is an electric heating wire that is embedded in the seat surface.

The seat air conditioner 90 is operated when the vehicle compartment may not be heated enough by the conditioned air blown from the air outlets 24, 25, 26 of the interior air conditioning unit 30, such that the passenger can feel warm enough.

An operation of the seat air conditioner 90 is controlled by a control signal output from the air conditioning controller 50. The air conditioning controller 50 controls the seat air conditioner 90 such that the surface temperature of the seat rises to about 40° C.

The vehicle air conditioner 1 may have a seat blower, a steering heater, a knee radiant heater. The seat blower is a blower that blows air from an inside of the seat toward the passenger. The steering heater is a steering heating portion that heats a steering by using an electric heater. The knee radiant heater is a heater that radiates a heat source light, which is a heat source of radiant heat, toward knees of the passenger. The seat blower, the steering heater, the knee radiant heater may be controlled based on control signals output from the air conditioning controller 50.

Each of the air conditioning controller 50 and an engine controller 70 shown in FIG. 2 is configured by a common microcomputer, which has CPU, ROM, and RAM, and a peripheral circuit. Various devices are connected to an output side of each of the air conditioning controller 50 and the engine controller 70. The air conditioning controller 50 and the engine controller 70 performs various calculations and various processing based on control programs stored in the ROMs to control operations of the various devices. The air conditioning controller 50 performs the air conditioning. The engine controller 70 is a controller that controls an operation of the engine EG.

The output side of the engine controller 70 is connected to various engine components that configure the engine EG. The various engine components include operation circuits for a starter and a fuel injection valve. The starter is a starting portion that starts an operation of the engine EG. The fuel injection valve is a fuel supply portion that supplies fuel to the engine EG.

An input side of the engine controller 70 is connected to sensors (not shown) for controlling the engine EG. The sensors include an accelerator opening degree sensor, an engine rotational speed sensor, and a vehicle speed sensor.

The accelerator opening degree sensor is, i.e., an accelerator opening degree detector that detects an accelerator opening degree Acc. The engine rotational speed sensor is, i.e., an engine rotational speed detector that detects a rotational speed Ne of the engine EG. The vehicle speed sensor is, i.e., a vehicle speed detector that detects a vehicle speed Vv.

The output side of the air conditioning controller 50 is connected to the blower 32, an electromagnetic clutch 61 of the compressor 11, the blower fan 12a of the exterior blower, the electric actuators 62, 63, 64, the PTC heater 37, the coolant pump 40a, and the seat air conditioner 90.

An input side of the air conditioning controller 50 is connected to sensors for controlling the air conditioning. The sensors include an inside air sensor 51, an outside air sensor 52, an insolation sensor 53, a discharge temperature sensor 54, a discharge pressure sensor 55, an evaporator temperature sensor 56, a coolant temperature sensor 58, a window ambient humidity sensor 59, a window ambient temperature sensor, and a window surface temperature sensor.

The inside air sensor 51 is a room temperature detector that detects a room temperature Tr of the vehicle compartment. The outside air sensor 52 is an outside temperature detector that detects an outside air temperature Tam. The insolation sensor 53 is an insolation detector that detects an insolation amount Ts inside the vehicle compartment.

The discharge temperature sensor 54 is a discharge temperature detector that detects a temperature Td of the refrigerant discharged by the compressor 11. The discharge pressure sensor 55 is a discharge pressure detector that detects a pressure Pd of the refrigerant discharged by the compressor 11.

The evaporator temperature sensor 56 is an evaporator temperature detector that detects an evaporator temperature TE. The evaporator temperature TE is a temperature (i.e., a blowing air temperature) of air flowing out of the evaporator 15.

In other words, the evaporator temperature sensor 56 is a fin temperature sensor that detects a temperature of a heat exchanging fin of the evaporator 15. The evaporator temperature sensor 56 may be another temperature sensor that detects a temperature of another portion of the evaporator 15. Alternatively, the evaporator temperature sensor 56 may be a refrigerant temperature sensor that directly detects a temperature of the refrigerant flowing in the evaporator 15.

The coolant temperature sensor 58 is a coolant temperature detector that detects a coolant temperature Tw of the coolant flowing out of the engine EG.

The window ambient humidity sensor 59 is a humidity detector that detects a window ambient relative humidity. The window ambient relative humidity is a relative humidity of the inside air near the window inside the vehicle compartment. The window ambient temperature sensor is a window ambient temperature detector that detects a temperature of the inside air near the window. The window surface temperature sensor is a window surface temperature detector that detects a surface temperature of the window.

Detection values detected by the window ambient humidity sensor 59, the window ambient temperature sensor, and the window surface temperature sensor are used to calculate a relative humidity RHW of a portion proximate to the surface of the window.

The input side of the air conditioning controller 50 is connected to various air conditioning operation switches, and operation signals from the air conditioning operation switches are input to the air conditioning controller 50. The air conditioning operation switches are provided in an operation panel 60. The operation panel 60 is arranged adjacent to the instrument panel that is located in the foremost area in the vehicle compartment.

The air conditioning operation switches include an operation switch 60a for the vehicle air conditioner 1, an auto switch, an operation mode setting switch, a blowing mode setting switch, an air volume setting switch 60b, a room temperature setting switch 60c, and an economy switch 60d.

The auto switch is an auto control setting switch that is operated by the passenger and switches an auto control of the vehicle air conditioner 1 between being on and being off. The air volume setting switch 60b is an air volume adjuster that adjusts a volume (i.e., an air volume) of the air blown by the blower 32. The room temperature setting switch 60c is a target temperature setting part that is operated by the passenger and sets a target room temperature Tset.

The economy switch 60d is a switch that gives a priority to reducing a load to the environment. When the economy switch 60d is on, an operation mode of the vehicle air conditioner 1 is set to an economy mode. The economy mode is a power saving priority mode that gives a priority to saving power used for the air conditioning. Thus, the economy switch 60d is a power saving priority mode setting part that sets the power saving priority mode.

When the economy switch 60d is on, the economy switch 60d outputs a signal, which includes information that the economy mode is set, to the engine controller 70. The engine controller 70 decreases an operational frequency of the engine EG, which is a rate of operating the engine EG for the air conditioning, when the signal is input to the engine controller 70. In other words, the engine controller 70 decreases an operational frequency of the engine EG, which is a rate of operating the engine EG for operating the compressor 11, when the signal is input to the engine controller 70.

The operation panel 60 has a display 60e. The display 60e displays a current operation state of the vehicle air conditioner 1.

The air conditioning controller 50 and the engine controller 70 are electrically connected to each other and configured to communicate with each other. Accordingly, when a detection signal or an operational signal is input to one controller of the air conditioning controller 50 and the engine controller 70, an other controller of the air conditioning controller 50 and the engine controller 70 can control the various devices connected to the output side of the other controller based on the detection signal or the operational signal input to the one controller.

For example, the air conditioning controller 50 outputs a request signal, which request to start the engine EG, to the engine controller 70, then the engine controller 70 starts the engine EG. Specifically, the engine controller 70 determines a necessity of starting the engine EG when receiving the request signal (i.e., an operation request signal), which is output from the air conditioning controller 50 and requests to start the engine EG, and then controls an operation of the engine EG depending on a determination result.

The output side of each of the air conditioning controller 50 and the engine controller 70 is connected to various control target devices. The each of the air conditioning controller 50 and the engine controller 70 has hardware and software that control the various control target devices.

That is, the hardware and the software of each of the air conditioning controller 50 and the engine controller 70 are a control section that controls an operation of a control target device.

The engine controller 70 performs an idle stop control that stops the engine EG when the engine EG comes into an idle state. The hardware and the software of the engine controller 70 performing the idle stop control are an idle stop control section.

The hardware and the software of the air conditioning controller 50, which controls an operation of the electromagnetic clutch 61 of the compressor 11 thereby controlling the refrigerant discharge performance of the compressor 11, are a compressor control section. The hardware and the software of the air conditioning controller 50, which control switching of the blowing modes, are a blowing mode setting part 50b.

The hardware and the software of the air conditioning controller 50, which control a cooling performance of the evaporator 15, is a cooling performance control section 50c. The hardware and the software of the air conditioning controller 50, which control a heating performance of the heater core 36, is a heating performance control section.

The hardware and the software of the air conditioning controller 50, which deliver a control signal between the air conditioning controller 50 and the engine controller 70, is a prohibition request output part 50d (prohibition signal output part). The prohibition request output part 50d is a prohibition request part that outputs an idle stop prohibition request to the engine controller 70. The idle stop prohibition request is a request to prohibit the idle stop control and to start the engine EG.

The hardware and the software of the engine controller 70, which deliver a control signal between the air conditioning controller 50 and the engine controller 70, is a signal communication part. The hardware and the software of the engine controller 70, which determines a necessity of starting the engine EG based on output signals from the prohibition request output part 50*d* etc., is an operation necessity determining part.

Figure 3:
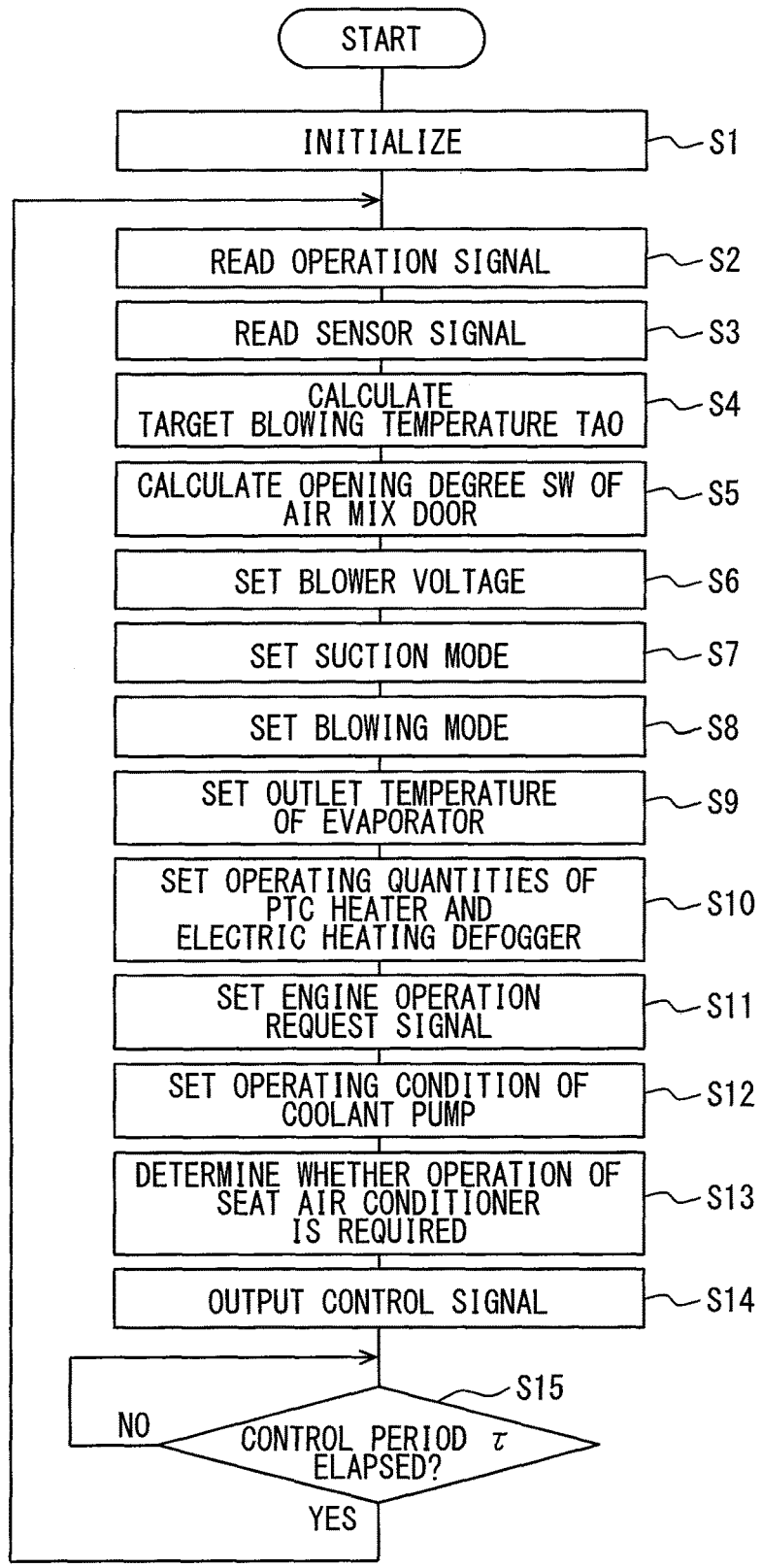
FIG. 3 is a flow chart showing a control flow of the vehicle air conditioner according to the first embodiment.

An operation of the vehicle air conditioner 1 having the above-described configurations will be described hereafter referring to FIG. 3 to FIG. 9. FIG. 3 is a flow chart showing a control flow of a main routine of the vehicle air conditioner 1 according to the present embodiment. The control flow starts when the operation switch of the vehicle air conditioner 1 is turned on while electric power is supplied from the battery 81 to various electric components and various devices mounted to the vehicle. The control sections shown in FIG. 3, FIG. 4, FIG. 6, and FIG. 8 configure a function exerting sections of the air conditioning controller 50.

At S1, a flag and a timer are initialized, and initial positions of the electric actuators are set. Some of flags and calculated values, which are stored when an operation of the vehicle air conditioner 1 is stopped the last time, may be kept without being initialized.

At S2, the operation signal from the operation panel 60 is read, and then the control flow advances to S3. The operation signal may be the target room temperature Tset, which is set by the room temperature setting switch 60*c*, or a setting signal from the suction mode setting part.

At S3, a signal, which includes information about a vehicle environment used for an air conditioning control, is read. Specifically, the air conditioning controller 50 reads detection signals from the sensors 51-59 at S3. In addition, the air conditioning controller 50 reads detection signals from sensors connected to the input side of the engine controller 70 and a part of control signals being output from the engine controller 70.

At S4, the air conditioning controller 50 calculates the target blowing temperature TAO, which is a target temperature of the air blown into the vehicle compartment. Section S4 is a target blowing temperature determining section. The target blowing temperature TAO is calculated using the following formula F1.

$$TAO = Kset \times Tset - Kr \times Tr - Kam \times Tam - Ks \times Ts + C \quad (F1)$$

Tset represents a set room temperature that is set by the room temperature setting switch 60*c*. Tr represents a room temperature that is detected by the inside air sensor 51. Tam represents an outside temperature that is detected by the outside air sensor 52. Ts represents an insolation amount that is detected by the insolation sensor 53. Kset, Kr, Kam, and Ks represent control gains. C represents a constant for correction.

The target blowing temperature TAO corresponds to an amount of heat that is required to be generated by the vehicle air conditioner 1 to maintain the room temperature at a required temperature. In other words, the target blowing temperature TAO is a heat load that is put on the vehicle air conditioner 1 to perform the air conditioning.

At S5 to S13, the air conditioning controller 50 determines control states of the various devices connected to the air conditioning controller 50. At S5, the air conditioning controller 50 calculates a target opening degree SW of the air mix door 39 based on the target blowing temperature TAO, the evaporator temperature TE, and the coolant temperature Tw.

Specifically, a tentative target opening degree SWdd of the air mix door 39 is calculated using the following formula F2.

$$SWdd = [\{TAO-(TE+2)\}/\{MAX(10, Tw-(TE+2))\}] \quad (F2)$$

{MAX (10, Tw−(TE+2)} means bigger one of 10 and Tw−(TE+2).

The target opening degree SW is determined using the tentative target opening degree SWdd and referring to a control map, and then the control flow advances to S6. The control map is stored in the air conditioning controller 50 in advance. The target opening degree SW is increased as the tentative target opening degree SWdd increases.

Figure 4:
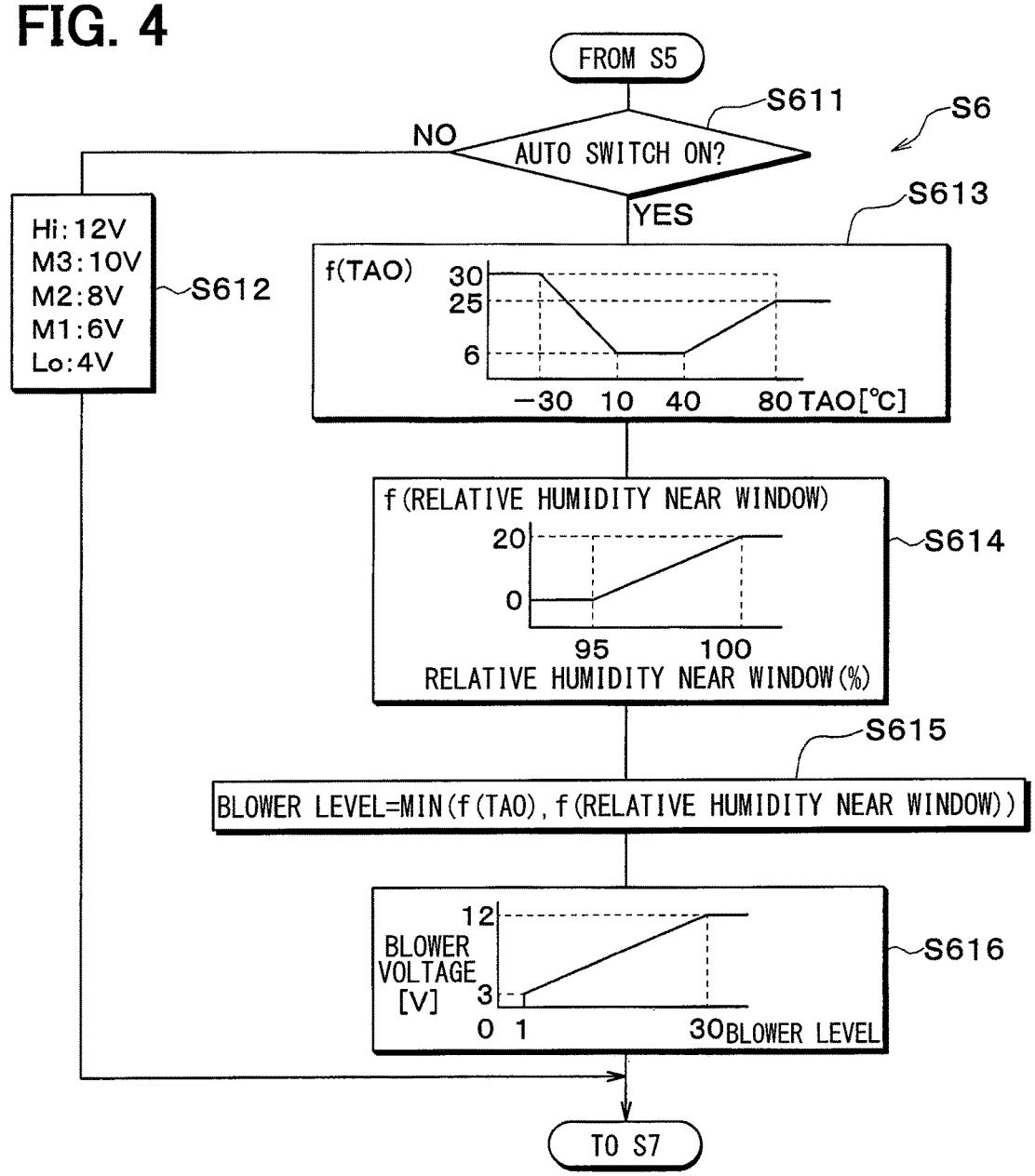
FIG. 4 is a flow chart showing a part of the control flow of the vehicle air conditioner according to the first embodiment.

At S6, the air conditioning controller 50 determines the air blowing performance of the blower 32. Specifically, a blower motor voltage, which is applied to the electric motor of the blower 32, is determined. FIG. 4 is a flow chart showing the control flow regarding S6 in detail.

At S611, it is determined whether the auto switch of the operation panel 60 is turned on (i.e., is ON). When the auto switch is determined not to be on, the control flow advances to S612. At S612, the blower motor voltage is set manually by the air volume setting switch 60*b* of the operation panel 60, and then the control flow advances to S7.

The air volume setting switch 60*b* is capable of setting five levels of the air volume, i.e., Lo, M1, M2, M3, and Hi. The blower motor voltage increases from Lo to Hi, e.g., the blower motor voltage is set to be 4V, 6V, 8V, 10V, and 12V with the air volume Lo, M1, M2, M3, and Hi respectively.

On the other hand, when the auto switch is determined to be on, a tentative blower level f(TAO) is determined at S613 based on the target blowing temperature TAO determined at S4 and referring to a control map. The control map is stored in the air conditioning controller 50 in advance.

The control map is, as shown by S613 in FIG. 4, the tentative blower level f(TAO) varies to be plotted in a curved line, i.e., in a bathtub shape, as the target blowing temperature TAO varies. That is, when the target blowing temperature TAO is in an extremely low temperature range and an extremely high temperature range, the tentative blower level f(TAO) is increased to a high level such that the volume (i.e., the air volume) of the air blown by the blower 32 approaches a maximum volume. According to the present embodiment, the extremely low temperature range is −30° C. or lower and the extremely high temperature range is 80° C. or higher. FIG. 4 shows an example that the extremely low temperature range is −30° C. or lower and the extremely high temperature range is 80° C. or higher.

When the target blowing temperature TAO rises from the extremely low temperature range to an intermediate temperature range, the tentative blower level f(TAO) is decreased such that the volume (i.e., the air volume) of the air blown by the blower 32 decreases as the target blowing temperature TAO rises. When the target blowing temperature TAO falls from the extremely high temperature range to the intermediate temperature range, the tentative blower level f(TAO) is decreased such that the volume of the air blown by the blower 32 decreases as the target blowing temperature TAO falls.

When the target blowing temperature TAO comes into the intermediate temperature range, the tentative blower level f(TAO) is decreased to a low level such that the volume (i.e., the air volume) of the air blown by the blower 32 becomes a minimum volume. According to the present embodiment, the intermediate temperature range is from 10° C. to 40° C. Thus, a base blower level corresponding to the heat load for performing the air conditioning is calculated.

The tentative blower level f(TAO) is determined based on the target blowing temperature TAO. The tentative blower level f(TAO) is determined based on a value, which is set based on the set room temperature Tset, the room temperature Tr, the outside air temperature Tam, and the insolation amount Ts.

At S614, a minimum blower level f(window ambient relative humidity) is determined based on the window ambient relative humidity detected by the window ambient humidity sensor 59 and referring to the control map of S614 shown in FIG. 4. The control map is stored in the air conditioning controller 50 in advance.

The minimum blower level f(window ambient relative humidity) is set to be 0 when the window ambient relative humidity is lower than 95%. The minimum blower level f(window ambient relative humidity) is set to be 20 when the window ambient relative humidity is 100% or higher. The minimum blower level f(window ambient relative humidity) is increased as the window ambient relative humidity increases when the window ambient relative humidity is in a range that is higher than or equal to 95% and lower than 100%.

At S615, a blower level is set to set the volume of the air blown by the blower 32. The blower level corresponds to a blower voltage applied to the electric motor of the blower 32. Specifically, the blower level is calculated using the following formula F3.

$$\text{Blower Level}=\text{MAX}(f(TAO), f(\text{window ambient relative humidity})) \quad (F3)$$

MAX (f(TAO), f(window ambient relative humidity)) means larger one of f(TAO) and f(window ambient relative humidity).

The blower level is thus set at S615, and then the control flow advances to S616. At S616, the blower voltage is set based on the blower level determined at S615 and referring to a control map stored in the air conditioning controller 50 in advance.

That is, as shown in S615 of FIG. 4, the blower motor voltage is increased as the blower level rises.

Accordingly, the minimum blower level f(window ambient relative humidity) is set larger as the window ambient relative humidity increases. As a result, when there is a high possibility of causing the window to be fogged, the minimum blower level f(window ambient relative humidity) is easily selected as the blower level, whereby the volume of the air blown by the blower 32 is increased easily.

At S7, the suction mode is set. That is, a switching state of the inside/outside air switching case 20 is set at S7. Specifically, a rate of the outside air introduced into the inside/outside air switching case 20 is set corresponding to the manual mode when the auto switch of the operation panel 60 is turned on (i.e., is ON). Then, the control flow advances to S8.

For example, the rate of the outside air is set to 0% when the suction mode is an inside air mode (i.e., REC mode), and the rate of the outside air is set to 100% when the suction mode is an outside air mode (i.e., FRS mode).

On the other hand, when the auto switch is on, the suction mode is set based on the target blowing temperature TAO and referring to a control map. The control map is stored in the air conditioning controller 50 in advance. For example, the suction mode is set to the outside air mode when the target blowing temperature TAO is in a high temperature range, the suction mode is set to an inside/outside mixing mode when the target blowing temperature TAO is in the intermediate temperature range, and the suction mode is set to the inside air mode when the target blowing temperature TAO is in a low temperature range.

At S8, the blowing mode is set. That is, the switching state regarding the face door 24*a*, the foot door 25*a*, and the defroster door 26*a* is set at S8. Specifically, the blowing mode is set based on the target blowing temperature TAO and referring to a control map. The control map is stored in the air conditioning controller 50 in advance.

For example, the blowing mode shifts to the face mode, the bi-level mode, and the foot mode in this order as the target blowing temperature TAO rises from the low temperature range to the high temperature range. As the result, the face mode is set mainly in summer, the bi-level mode is set mainly in spring and autumn, and the foot mode is set mainly in winter.

The foot-defroster mode or the defroster mode is set when the target blowing temperature TAO is in the high temperature range and when the window ambient relative humidity detected by the window ambient relative humidity is high thereby there is high possibility of causing the window to be fogged. As a result, a volume of the air flowing out of the defroster air outlet 26 can be increased.

Figure 5:
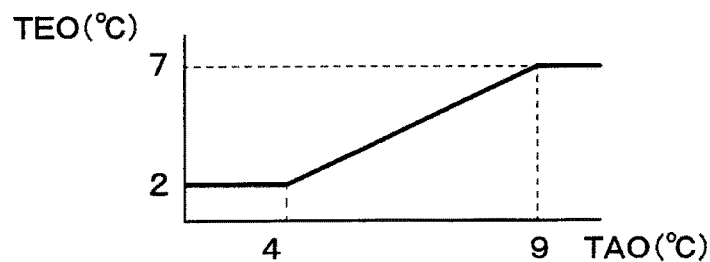
FIG. 5 is a graph illustrating control characteristics used for the control flow of the vehicle air conditioner according to the first embodiment.

At S9, a target evaporator temperature TEO is set as a target temperature of the evaporator temperature TE. For example, according to the present embodiment, the target evaporator temperature TEO is set based on the target blowing temperature TAO set at S4 and referring to a control map. The control map is stored in the air conditioning controller 50 in advance. The control map stored in the air conditioning controller 50 is shown in FIG. 5.

At S10, a quantity of the PTC heater 37 to be operated and an operation state of the electric heating defogger are set. The quantity of the PTC heater 37 to be operated is set based on the outside air temperature Tam, the tentative target opening degree SWdd, and the coolant temperature Tw.

Specifically, it is determined whether the outside temperature detected by the outside air sensor 52 is higher than a specified temperature (e.g., 26° C.). When the outside temperature is determined to be higher than 26° C., it is determined that the PTC heater 37 is not necessary to assist in increasing a blowing temperature of the air, therefore the quantity of the PTC heater 37 to be operated is set to zero. On the other hand, when the outside temperature is determined to be lower than 26° C., it is determined whether the PTC heater 37 is necessary to be operated based on the tentative target opening degree SWdd.

For example, it is determined that the PTC heater 37 is not necessary to be operated when the tentative target opening degree SWdd is small, and it is determined that the PTC heater 37 is necessary to be operated when the tentative target opening degree SWdd is large. That is, it is determined whether the PTC heater 37 is necessary to be operated based on a necessity of heating the air in the cool-air heating passage 33.

When it is determined that the PTC heater 37 is necessary to be operated, the quantity of the PTC heater 37 to be operated is set depending on the coolant temperature Tw. For example, the quantity of the PTC heater 37 to be operated is increased as the coolant temperature Tw decreases.

The operation state of the electric heating defogger is determined based on a possibility of causing the window to be fogged or based on a presence of a fogging of the window. The possibility and the presence may be estimated based on humidity and a temperature in the vehicle compartment.

At S11, a request signal, which is output by the air conditioning controller 50 and input to the engine controller 70, is set. For example, the request signal is the idle stop prohibition request.

The idle stop prohibition request signal is a signal that requests the engine controller 70 to prohibit the idle stop control. The idle stop control is a control for reducing a fuel consumption of the vehicle and stops the engine EG when the engine EG comes into the idle state.

The engine EG stops when the idle stop control is performed, whereby the compressor 11 of the refrigeration cycle 10 is stopped. Accordingly, a temperature of the refrigerant in the evaporator 15 rises, whereby a temperature of the air after passing through the evaporator 15 rises. That is, the evaporator 15 cannot cool and dehumidify the air. In addition, a temperature of the coolant cooling the engine EG falls, whereby a temperature of the air after passing through the heater core 36 falls. That is, the heater core 36 cannot heat the air.

Figure 6:
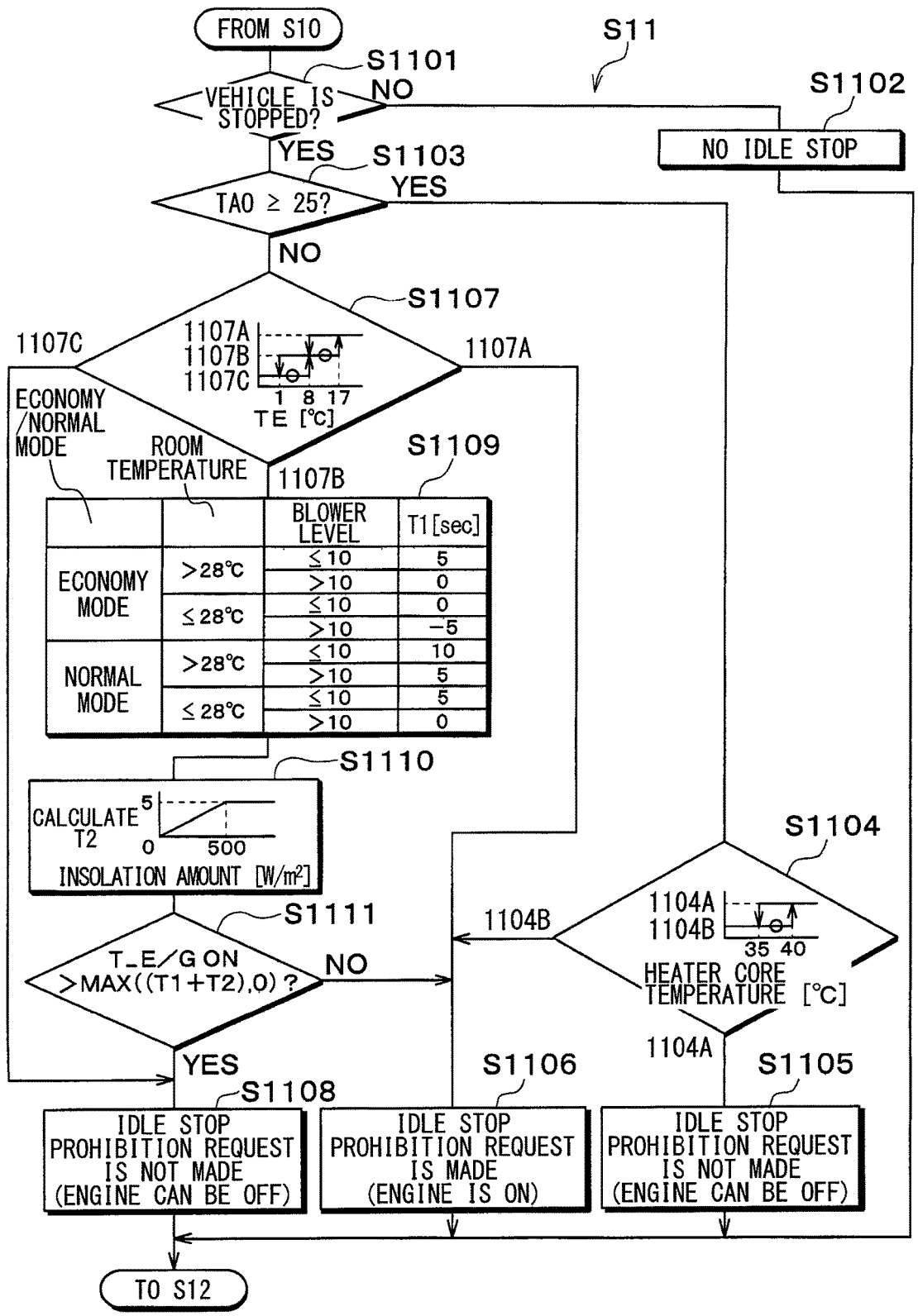
FIG. 6 is a flow chart showing a part of the control flow of the vehicle air conditioner according to the first embodiment.

S11 is shown in a flow chart of FIG. 6 in detail. At S1101, it is determined whether the vehicle is stopped. For example, it is determined whether the vehicle is stopped based on the vehicle speed Vv detected by the vehicle speed sensor.

When the vehicle is determined not to be stopped, i.e., determined to be moving, the air conditioning controller 50 determines, at S1102, to output the idle stop prohibition request signal. Then, the control flow advances to S12 shown in FIG. 8. That is, the idle stop is not performed while the vehicle is moving.

When the vehicle is determined to be stopped, the control flow advances to S1103 such that it is determined whether the target blowing temperature TAO of the air blown into the vehicle compartment is a specified temperature or higher. According to the example shown in FIG. 6, the specified temperature is 25° C.

When the target blowing temperature TAO is determined to be the specified temperature or higher, it is estimated that a heating operation is performed. Accordingly, the control flow advances to S1104 such that it is determined whether the heater core 36 is capable of heat the air sufficiently. Specifically, it is determined whether the heater core 36 is capable of heating the air sufficiently based on a temperature of the heater core 36 and a control map of S1104 shown in FIG. 6.

For example, the temperature of the heater core 36 is estimated using the coolant temperature Tw. The control map of S1104 shown in FIG. 6 is stored in the air conditioning controller 50 in advance.

Specifically, the heater core 36 is determined to be capable of heating the air sufficiently when the temperature of the heater core 36 is a possible heating temperature or higher (S1104: 1104A), and the heater core 36 is determined not to be capable of heating the air sufficiently when the temperature of the heater core 36 is lower than the possible heating temperature (S1104:1104B).

According to the control map of S1104 shown in FIG. 6, the possible heating temperature is 35° C. or 40° C. That is, according to the control map of S1104 shown in FIG. 6, a hysteresis width for suppressing control hunting is set with respect to each possible heating temperature.

When the heater core 36 is determined to be capable of heating the air sufficiently at S1104 (S1104: 1104A), the air conditioning controller 50 determines not to output the idle stop prohibition request signal at S1105. Then, the control flow advances to S12 shown in FIG. 8. Thus, the idle stop is performed and the fuel consumption is reduced.

On the other hand, when the heater core 36 is determined not to be capable of heating the air sufficiently at S1104 (S1104: 1104B), the air conditioning controller 50 determines to output the idle stop prohibition request signal at S1106. Then, the control flow advances to S12 of FIG. 8. Thus, the engine EG is started and the coolant temperature Tw rises, whereby the heater core 36 can heat the air.

When the target blowing temperature TAO is determined not to be the specified temperature or higher at S1103, it can be estimated that a cooling operation is performed. Accordingly, the control flow advances to S1107 such that it is determined whether the evaporator 15 is capable of cooling the air appropriately.

Specifically, the air conditioning controller 50 determines whether the evaporator 15 is capable of cooling the air sufficiently based on the evaporator temperature TE detected by the evaporator temperature sensor 56 and a control map of S1107 shown in FIG. 6. The control map of S1107 shown in FIG. 6 is stored in the air conditioning controller 50 in advance.

Specifically, the evaporator 15 is determined not to be capable of cooling the air sufficiently when the evaporator temperature TE is a possible cooling temperature or higher (S1107: 1107A). The evaporator 15 is determined to be capable of cooling the air sufficiently when the evaporator temperature TE is lower than the possible cooling temperature (S1107: 1107B). It is determined that the evaporator 15 cools the air excessively when the evaporator temperature TE is an excess cooling temperature (S1107: 1107C).

According to the control map of S1107 shown in FIG. 6, the possible cooling temperature is 8° C. or 17° C., and the excess cooling temperature is 1° C. or 8° C. That is, according to the control map of S1107 shown in FIG. 6, a hysteresis width for suppressing control hunting is set with respect to each possible cooling temperature and each excess cooling temperature.

When the evaporator 15 is determined not to be capable of cooling the air sufficiently at S1107 (S1107: 1107A), the air conditioning controller 50 determines to output the idle stop prohibition request signal at S1106. Then, the control flow advances to S12 shown in FIG. 8. Thus, the engine EG is started and the compressor 11 is started, whereby the evaporator 15 can cool the air.

On the other hand, when it is determined that the evaporator 15 cools the air excessively (S1107: 1107C), the air conditioning controller 50 determines not to output the idle stop prohibition request signal at S1108. Then, the control flow advances to S12 shown in FIG. 8. Thus, the idle stop is performed, whereby the fuel consumption is reduced.

When the evaporator 15 is determined to be capable of cooling the air appropriately (S1107: 1107B), the control flow advances to S1109 and the air conditioning controller 50 sets a tentative required cooling time T1. Specifically, the tentative required cooling time T1 is set based on whether the economy mode is set, the room temperature Tr, the blower level, and a control map of S1109 shown in FIG. 6. The control map of S1109 shown in FIG. 6 is stored in the air conditioning controller 50 in advance.

When the economy mode is on, the air conditioning controller 50 sets the tentative required cooling time T1 to be shorter than the tentative required cooling time T1, which is set when the economy mode is off. Thus, duration while the cooling operation is performed is shortened when the economy mode is on, whereby the fuel consumption can be reduced.

When the room temperature Tr is high, the air conditioning controller 50 sets the tentative required cooling time T1 to be longer than the tentative required cooling time T1 that is set when the room temperature Tr is low. When the blower level is high, the air conditioning controller 50 sets the tentative required cooling time T1 to be shorter than the tentative required cooling time T1 that is set when the blower level is low.

Figure 7:
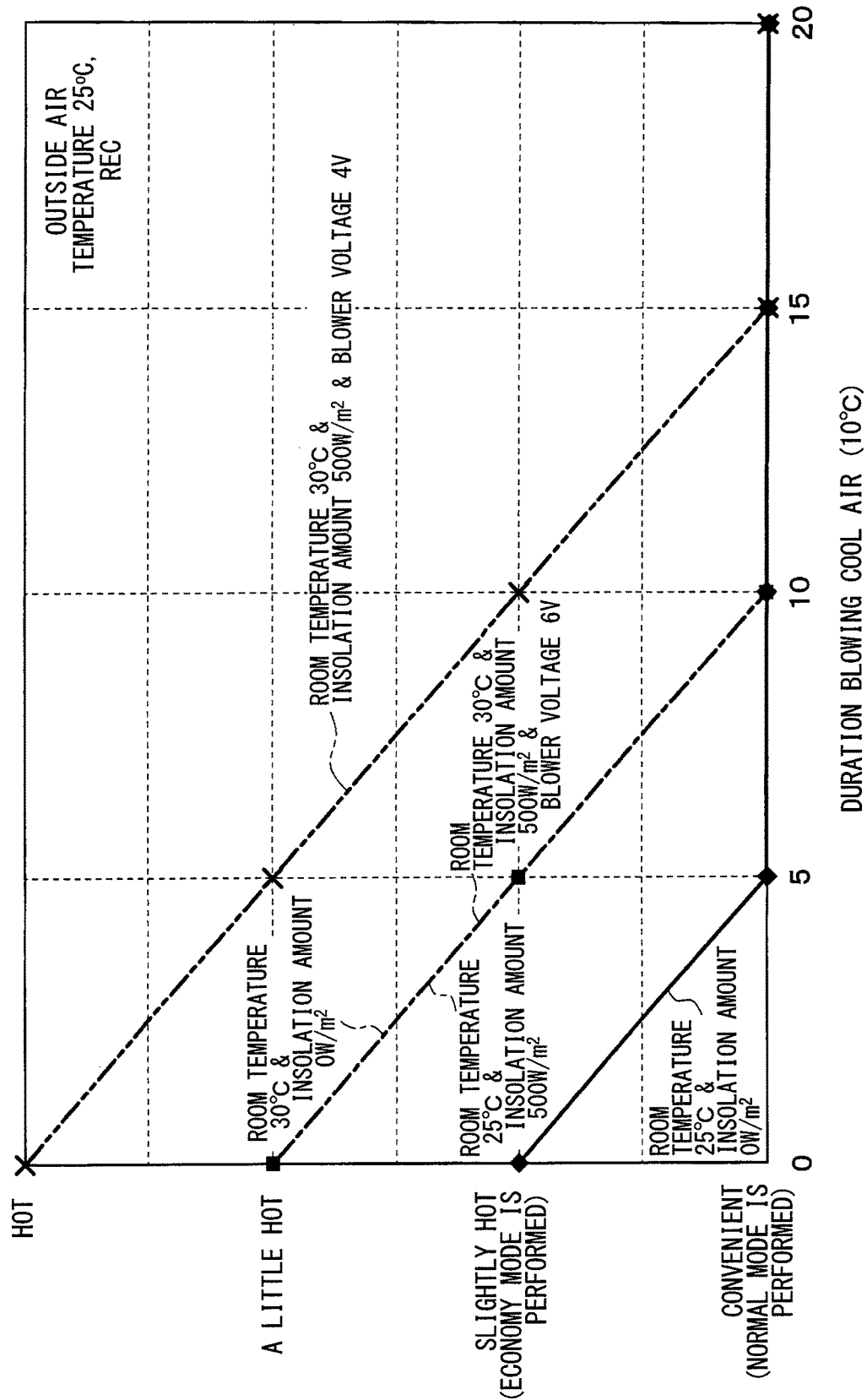
FIG. 7 is an explanatory diagram illustrating a relationship among a room temperature, an insolation amount, volume, and a feeling of a passenger.

That is, according to experimental results shown in FIG. 7, the higher the room temperature Tr is, the longer an operation duration, while the cooling operation is performed until the passenger stops feeling hot, is. Further, the higher the blower level is, the shorter the operation duration is. The tentative required cooling time T1 is set considering those points, whereby the passenger can be secured to feel comfortable by performing the cooling operation until the passenger stops feeling hot.

At S1110, an insolation correction time T2 is set. The insolation correction time T2 is set based on the insolation amount Ts and a control map of S1110 shown in FIG. 6. The control map of S1110 shown in FIG. 6 is stored in the air conditioning controller 50 in advance. Specifically, when the insolation amount Ts is large, the insolation correction time T2 is set to be longer than the insolation correction time T2 that is set when the insolation amount Ts is small.

At S1111, it is determined whether the passenger stops feeling hot based on an elapsed time T_EGON and a required cooling time T_COOL. Specifically, the passenger is estimated to stop feeling hot when the following formula F4 is satisfied, and estimated not to stop feeling hot when the following formula F4 is not satisfied.

$$T\_EGON > T\_COOL \tag{F4}$$

The elapsed time T_EGON is a time that elapses from the engine EG is started. The elapsed time T_EGON is reset when the engine EG is stopped. The required cooling time T_COOL is expressed by the following formula F5.

$$T\_COOL = MAX\{(T1+T2), 0\} \tag{F5}$$

MAX $\{(T1+T2), 0\}$ means larger one of $(T1+T2)$ and zero.

When the passenger is estimated to stop feeling hot at S1111 (S1111: YES), the air conditioning controller 50 determines not to output the idle stop prohibition request signal at S1108. Then, the control flow advances to S12 of FIG. 8. Thus, the idle stop is performed, whereby the fuel consumption can be reduced.

When the passenger is estimated not to stop feeling hot at S1111 (S1111: NO), the air conditioning controller 50 determines to output the idle stop prohibition request signal at S1106. Then, the control flow advances to S12 of FIG. 8. Thus, the engine EG is started and the compressor 11 is started, whereby the evaporator 15 can cool the air.

Figure 8:
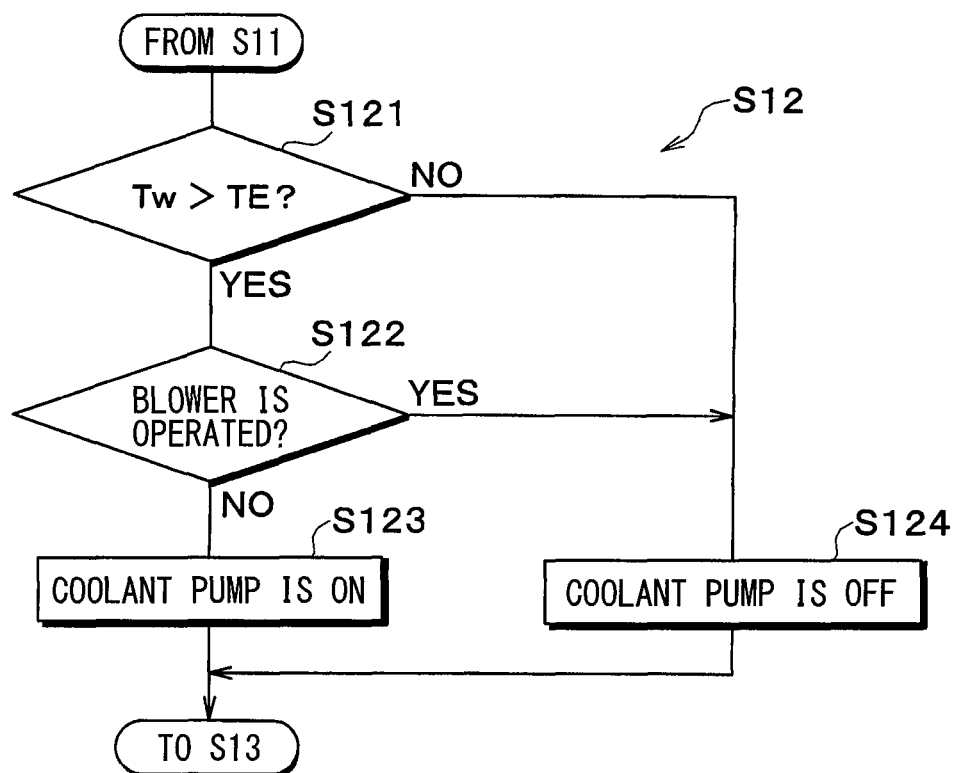
FIG. 8 is a flow chart showing a part of the control flow of the vehicle air conditioner according to the first embodiment.

At S12, it is determined whether the coolant pump 40a of the coolant circuit 40 is necessary to be operated. A flow chart of FIG. 8 shows S12 in detail. At S121, it is determined whether the coolant temperature Tw is higher than the evaporator temperature TE.

When the coolant temperature Tw is determined to be the evaporator temperature TE or lower at S121, the control flow advances to S124, and then the air conditioning controller 50 determines to stop the coolant pump 40a. Here, the coolant pump 40a is stopped at S124 because of the following reason. When the coolant flows into the heater core 36 while the coolant temperature Tw is the evaporator temperature TE or lower, the coolant flowing in the heater core 36 cools the air after passing through the evaporator 15. As a result, the temperature of the air blown into the vehicle compartment falls.

When the coolant temperature Tw is determined to be the evaporator temperature TE or higher, the control flow advances to S122. At S122, it is determined whether the blower 32 is being operated. When the blower 32 is determined to be off at S122, the control flow advances to S124, then the air conditioning controller 50 determines to stop the coolant pump 40a for saving power.

On the other hand, when the blower 32 is determined to be on at S122, the control flow advances to S123, then the air conditioning controller 50 determines to operate the coolant pump 40a. As a result, the coolant circulates in the coolant circuit 40, whereby the air can be heated by performing a heat exchange between the coolant flowing in the heater core 36 and the air passing through the heater core 36.

At S13, it is determined whether the seat air conditioner 90 is necessary to be operated. An operation state of the seat air conditioner 90 is set based on the target blowing temperature TAO, the tentative target opening degree Sdd, and the outside air temperature Tam and referring to a control map. The control map is stored in the air conditioning controller 50 in advance.

At S14, the air conditioning controller 50 outputs control signals and control voltages to various devices such as the blower fan 12a, the blower 32, the PTC heater 37, the coolant pump 40a, the electromagnetic clutch 61, electric actuators 62-64, and the seat air conditioner 90, such that control states determined from S5 to S13 are obtained. In addition, the prohibition request output part 50d outputs the request signal, which is set at S11, to the engine controller 70.

At S15, the air conditioning controller 50 waits for a control period T, and then returns to S2 when determining the control period T elapses. According to the present embodiment, the control period T is 250 milliseconds. Even in a case that the control period T for an air conditioning control is set longer as compared to a control period T for an engine control, the control period T for the air conditioning control has no negative effect on a performance of the air conditioning control. Therefore, an amount of communication for performing the air conditioning control can be reduced, whereby an amount of communication for a control system, such as the engine control which is necessary to be performed quickly, can be secured.

The vehicle air conditioner 1 is operated as described above, whereby the air blown by the blower 32 is cooled in the evaporator 15 to be a cool air. The cool air cooled in the evaporator 15 flows to the cool-air heating passage 33 and the cool air bypass passage 34 depending on the opening degree of the air mix door 39.

The cool air flowing into the cool-air heating passage 33 is heated while passing through the heater core 36 and the PTC heater 37, thereby being mixed with the cool air after passing through the cool air bypass passage 34 in the mixing space 35. Accordingly, a conditioned air, of which temperature is adjusted in the mixing space 35, is blown from the mixing space 35 into the vehicle compartment through the air outlets.

The cooling operation for cooling the vehicle compartment is performed when the room temperature becomes lower than the outside temperature Tam by the conditioned air. The heating operation for heating the vehicle compartment is performed when the room temperature becomes higher than the outside temperature Tam by the conditioned air.

Figure 9:
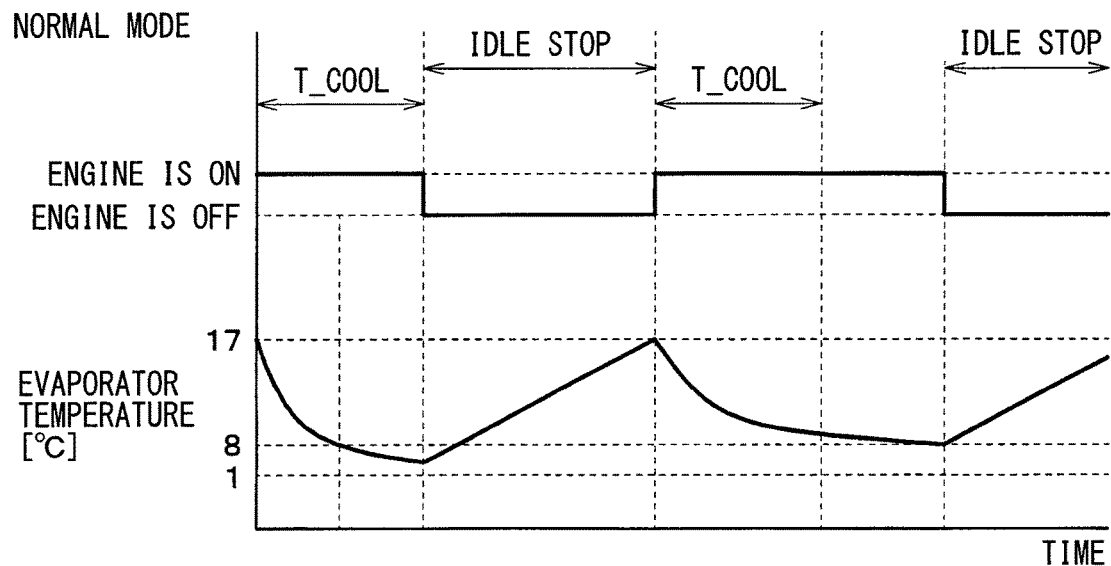
FIG. 9 is a time chart showing an example of a control result of the vehicle air conditioner according to the first embodiment.

The vehicle air conditioner 1 performs the control flow of S11, such that the idle stop is prohibited, for example, as shown in a time chart of FIG. 9.

FIG. 9 shows an example of a time chart in the cooling operation. When the temperature of the evaporator 15 exceeds 17° C. and the evaporator 15 cannot cool the air while the vehicle is stopped, the idle stop is prohibited and the engine EG is started. Accordingly, a low-temperature and low-pressure refrigerant flows in the evaporator 15, and the temperature of the evaporator 15 falls. As a result, the evaporator 15 can cool the air.

When the temperature of the evaporator 15 falls below 8° C. whereby the evaporator 15 cools the air excessively and the required cooling temperature T_COOL elapses, the idle stop is started and the engine EG is stopped. Accordingly, the low-temperature and low-pressure refrigerant does not flow into the evaporator 15, whereby the temperature of the evaporator 15 rises gradually. The air is cooled by a residual cold heat of the evaporator 15 until the temperature of the evaporator 15 reaches 17° C.

When the temperature of the evaporator 15 rises above 17° C. and the evaporator 15 cannot cool the air while the vehicle is stopped, the idle stop is prohibited again and the engine EG is started. Accordingly, the low-temperature and low-pressure refrigerant flows into the evaporator 15 again, and the temperature of the evaporator 15 falls. Thus, the evaporator 15 can cool the air.

The above-described control is performed repeatedly while the vehicle is stopped. Accordingly, the fuel consumption can be reduced by performing the idle stop while the passenger can be secured to feel cool. Furthermore, a frequency of outputting the idle stop prohibition request in the cooling operation can be reduced, whereby the fuel consumption can be reduced more effectively by performing the idle stop.

The idle stop prohibition control is performed in the heating operation similar to the cooling operation. Accordingly, an illustration and a description regarding a time chart in the heating operation are omitted.

According to the present embodiment, the prohibition request output part 50d of the air conditioning controller 50 outputs the request, which prohibits the idle stop control, to the idle stop controlling section of the engine controller 70 (S11) when the engine EG is operated. The request prohibits the idle stop control until the temperature (i.e., the evaporator temperature TE) of the evaporator 15 falls to a temperature that enables the evaporator 15 to cool the air and the required cooling time T_COOL, which is estimated to be required to make the passenger feel cool by the air cooled in the evaporator 15, elapses.

Accordingly, the engine EG can be prevented from being operated briefly and then being stopped before the passenger feels cool. That is, it can be suppressed that the compressor 11 is stopped and therefore the evaporator 15 comes into a state of not being capable of cooling the air before the passenger feels cool. Thus, the comfort air conditioning can be improved.

In addition, a frequency of switching the engine EG between being operated and being stopped can be reduced, whereby a feeling of the passenger can be prevented from changing by the air conditioning and power consumption for starting the engine EG can be reduced.

According to the present embodiment, the prohibition request output part 50d of the air conditioning controller 50 extends the required cooling time T_COOL as the insolation amount Ts increases at S11.

Accordingly, duration while the engine EG is operated can be extended when the insolation amount Ts is large. As a result, it can be suppressed that the compressor 11 is stopped and therefore the evaporator 15 comes into a state of not being capable of cooling the air before the passenger feels cool, even when the passenger hardly feels cool as the insolation amount Ts increases.

According to the present embodiment, when the economy mode is on, the prohibition request output part 50d of the air conditioning controller 50 shortens the required cooling time T_COOL as compared to the required cooling time T_COOL that is set when the economy mode is off.

Accordingly, when the passenger gives a priority to saving power over the comfort air conditioning, duration while the engine EG is operated can be shortened by setting the economy mode. Thus, both improving the comfort air conditioning and reducing the fuel consumption can be achieved as required by the passenger.

According to the present embodiment, the prohibition request output part 50d of the air conditioning controller 50, at S11, extends the required cooling time T_COOL as the room temperature Tr rises.

As a result, the duration while the engine EG is operated can be extended when the room temperature Tr is high. Thus, it can be suppressed that the compressor 11 is stopped and therefore the evaporator 15 comes into a state of not being capable of cooling the air before the passenger feels cool, even when the passenger hardly feels cool because the room temperature Tr is high.

According to the present embodiment, the prohibition request output part 50d of the air conditioning controller 50, at S11, shortens the required cooling time T_COOL as the volume of the air blown by the blower 32 increases.

Accordingly, the duration while the engine EG is operated can be shortened when the volume of the air is large. The passenger can feel cool promptly when the volume of the air is large, whereby it can be suppressed that the engine EG is operated for an excessively long time and the fuel consumption increases.

Second Embodiment

According to the above-described first embodiment, the idle stop is prohibited until the elapsed time T_EGON from the engine EG is started becomes longer than the required cooling time T_COOL. According to the present embodiment, as shown in FIG. 9, the idle stop is prohibited until an elapsed time, which elapses after the temperature of the evaporator 15 becomes lower than an excess cooling temperature (e.g., 8° C.), becomes longer than the required cooling time T_COOL. As a result, the passenger can be secured to feel comfortable more certainly.

Figure 10:
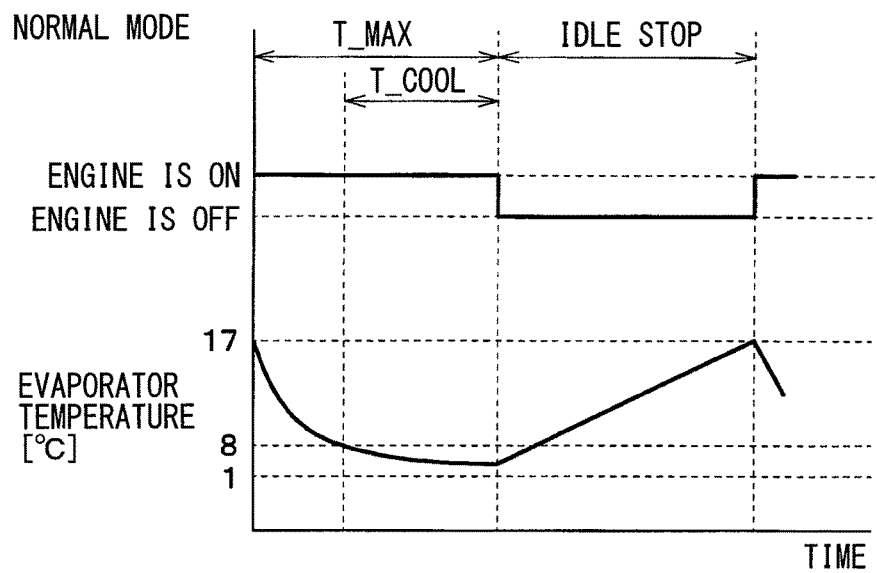
FIG. 10 is a time chart showing an example of a control result of a vehicle air conditioner according to a second embodiment.

According to an example of FIG. 10, the idle stop is performed when the elapsed time T_EGON, which elapses after the engine EG is started, becomes longer than a maximum time T_MAX even when the elapsed time, which elapses after the temperature of the evaporator 15 becomes lower than the excess cooling temperature (e.g., 8° C.), is not longer than the required cooling time T_COOL. As a result, it can be suppressed that the fuel consumption increases.

According to the present embodiment, the prohibition request output part 50d of the air conditioning controller 50 stops outputting the idle stop prohibition request to the idle stop controlling section of the engine controller 70 when the maximum time T_MAX elapses even before the required cooling time T_COOL elapses. As a result, it can be suppressed that the duration while the engine EG is operated for the air conditioning becomes too long and thereby the fuel consumption increases.

(Modifications)

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

For example, the vehicle air conditioner 1 is mounted to the vehicle that obtains power from the engine EG to move according to the above-described embodiments. However, the vehicle air conditioner 1 may be mounted to a hybrid vehicle that moves using power generated by both the engine EG and an electric motor for moving the vehicle.

What is claimed is:

1. A vehicle air conditioner mounted to a vehicle having an idle stop controller, the idle stop controller performing an idle stop control that stops an engine when the engine comes into an idle state, the vehicle air conditioner comprising:
 a compressor that is operated by the engine, the compressor drawing a refrigerant and discharging the refrigerant;
 a radiator that dissipates heat of the refrigerant discharged from the compressor;
 a pressure reducer that decompresses and expands the refrigerant, which flows to the pressure reducer after dissipating the heat in the radiator;
 a cooling heat exchanger that cools an air, which is blown into a vehicle compartment, by using the refrigerant, which flows to the cooling heat exchanger after being decompressed and expanded in the pressure reducer;
 a temperature detector that detects a temperature of the cooling heat exchanger;
 a controller configured to output a request to the idle stop controller when the engine is operated, the request prohibits the idle stop control until the temperature of the cooling heat exchanger falls to a temperature that enables the cooling heat exchanger to cool the air and a required cooling time elapses; and
 an insolation amount detector detecting an insolation amount, wherein
 the prohibition request output part extends the required cooling time as the insolation amount increases, and
 the controller stops outputting the request to the idle stop controller when a limit time elapses, even before the required cooling time elapses.

2. A vehicle air conditioner mounted to a vehicle having an idle stop controller, the idle stop controller performing an idle stop control that stops an engine when the engine comes into an idle state, the vehicle air conditioner comprising:
 a compressor that is operated by the engine, the compressor drawing a refrigerant and discharging the refrigerant;
 a radiator that dissipates heat of the refrigerant discharged from the compressor;
 a pressure reducer that decompresses and expands the refrigerant, which flows to the pressure reducer after dissipating the heat in the radiator;
 a cooling heat exchanger that cools an air, which is blown into a vehicle compartment, by using the refrigerant, which flows to the cooling heat exchanger after being decompressed and expanded in the pressure reducer;
 a temperature detector that detects a temperature of the cooling heat exchanger;
 a controller configured to output a request to the idle stop controller when the engine is operated, the request prohibits the idle stop control until the temperature of the cooling heat exchanger falls to a temperature that enables the cooling heat exchanger to cool the air and a required cooling time elapses; and
 an economy switch that is operated by the passenger and sets a power saving priority mode in which a power saving is given priority over an air conditioning, wherein
 when the power saving priority mode is set, the prohibition request output part shortens the required cooling time as compared to a case that the power saving priority mode is not set.

3. A vehicle air conditioner mounted to a vehicle having an idle stop controller, the idle stop controller performing an idle stop control that stops an engine when the engine comes into an idle state, the vehicle air conditioner comprising:
 a compressor that is operated by the engine, the compressor drawing a refrigerant and discharging the refrigerant;
 a radiator that dissipates heat of the refrigerant discharged from the compressor;
 a pressure reducer that decompresses and expands the refrigerant, which flows to the pressure reducer after dissipating the heat in the radiator;
 a cooling heat exchanger that cools an air, which is blown into a vehicle compartment, by using the refrigerant, which flows to the cooling heat exchanger after being decompressed and expanded in the pressure reducer;
 a temperature detector that detects a temperature of the cooling heat exchanger;
 a controller configured to output a request to the idle stop controller when the engine is operated, the request prohibits the idle stop control until the temperature of the cooling heat exchanger falls to a temperature that enables the cooling heat exchanger to cool the air and a required cooling time elapses; and
 a room temperature detector that detects a room temperature of the vehicle compartment, wherein
 the controller extends the required cooling time as the room temperature rises.

4. A vehicle air conditioner mounted to a vehicle having an idle stop controller, the idle stop controller performing an idle stop control that stops an engine when the engine comes into an idle state, the vehicle air conditioner comprising:
 a compressor that is operated by the engine, the compressor drawing a refrigerant and discharging the refrigerant;
 a radiator that dissipates heat of the refrigerant discharged from the compressor;
 a pressure reducer that decompresses and expands the refrigerant, which flows to the pressure reducer after dissipating the heat in the radiator;
 a cooling heat exchanger that cools an air, which is blown into a vehicle compartment, by using the refrigerant, which flows to the cooling heat exchanger after being decompressed and expanded in the pressure reducer;
 a temperature detector that detects a temperature of the cooling heat exchanger;
 a controller configured to output a request to the idle stop controller when the engine is operated, the request prohibits the idle stop control until the temperature of the cooling heat exchanger falls to a temperature that enables the cooling heat exchanger to cool the air and a required cooling time elapses;
 a blower that blows the air toward the vehicle compartment; and an air volume controller that controls a volume of the air blown by the blower, wherein the controller shortens the required cooling time as the volume of the air increases.

* * * * *